United States Patent [19]

Bjorge et al.

[11] Patent Number: 5,295,236
[45] Date of Patent: Mar. 15, 1994

[54] APPLYING TRAPS TO A PRINTED PAGE SPECIFIED IN A PAGE DESCRIPTION LANGUAGE FORMAT

[75] Inventors: Per H. Bjorge, Hollis; Alan Blannin; Keith R. Deutsch, both of Amherst, all of N.H.

[73] Assignee: Aldus Corporation, Seattle, Wash.

[21] Appl. No.: 664,064

[22] Filed: Mar. 4, 1991

[51] Int. Cl.$^5$ ............................................. G06F 15/62
[52] U.S. Cl. ..................................... 395/134; 395/131
[58] Field of Search ................ 395/100, 118, 144–148, 395/155, 161, 117, 134, 135, 131, 109; 358/316, 318, 334, 17, 42, 75, 80; 340/703

[56] References Cited

U.S. PATENT DOCUMENTS

| | | | |
|---|---|---|---|
| 4,115,816 | 9/1978 | Moe et al. | 358/283 |
| 4,464,677 | 8/1984 | Kuhn et al. | 358/75 |
| 4,583,116 | 4/1986 | Hennig et al. | 358/75 |
| 4,603,431 | 7/1986 | Grover et al. | 382/56 |
| 4,683,492 | 7/1987 | Sugiura et al. | 358/80 |
| 4,815,009 | 3/1989 | Blatin | 395/134 |
| 4,817,187 | 3/1989 | Lien | 382/56 |
| 4,821,336 | 4/1989 | Roye | 382/56 |
| 4,824,761 | 4/1989 | Sturgis et al. | 430/209 |
| 4,852,485 | 8/1989 | Brunner | 101/211 |
| 4,916,484 | 4/1990 | Ohlig | 355/91 |
| 4,931,861 | 6/1990 | Taniguchi | 358/75 |
| 5,029,115 | 7/1991 | Geraci | 364/523 |
| 5,043,711 | 8/1991 | Harrington | 340/728 |
| 5,113,249 | 5/1992 | Yosefi | 358/75 |
| 5,115,402 | 5/1992 | Matsushiro et al. | 395/141 |
| 5,131,058 | 7/1992 | Ting et al. | 382/47 |

FOREIGN PATENT DOCUMENTS

0189238A1 7/1986 European Pat. Off. .

*Primary Examiner*—Heather Herndon
*Attorney, Agent, or Firm*—Christensen, O'Connor, Johnson & Kindness

[57] ABSTRACT

A trapping technique which accepts a Postscript or other page description language (PDL) file and outputs a file in PDL format having the correct traps. The input page is first divided into sub-portions, or tiles, and the tiles are individually processed by evaluating the input file in a corresponding clipping window. Each tile is then analyzed to determine where edges exist. The edge data is fed to an edge converter which produces a list of color transitions consisting of the analytic description of each edge and the color information along the sides of the edge. The color transition information is fed to a trapping analyzer which generates trap vectors in accordance with a set of desired trapping rules. The trap vectors are then converted to PDL form. As a final step, the trap vectors are added to the original PDL file. The final trapped page may be printed on standard typesetters without the need for special trap generator hardware.

18 Claims, 7 Drawing Sheets

```
% sample postscript code segment
% describes a cyan triangle partially overlaying a key diamond shape
% on a yellow background gsave
%scale background rectangle to supertile size at 300 dpi virtual scan
.9216 .9216 scale % set background color (CMYK)
0 0 1 0 setcmykcolor
% create and fill background
newpath
0 0 moveto 0 25 lineto 25 0 lineto closepath fill
% set fill color to key
0 0 0 1 setcmykcolor
% create and fill key diamond shape
newpath
10 7.5 moveto 5 12.5 lineto 15 12.5 lineto closepath fill
%set fill color to cyan
1 0 0 0 setcmykcolor
% create and fill cyan triangle
newpath
20 7.5 moveto 12 12.5 lineto closepath fill grestore
```

FIG. 5

| VECTOR | LEFT COLOR | RIGHT COLOR | |
|---|---|---|---|
| (11.52, 10.8) to (12.51, 10.22) | CYAN | KEY | |
| (12.51, 10.22) to (14.4, 9.09) | CYAN | YELLOW | 710 |
| (11.52, 9.8) to (12.51, 10.22) | KEY | YELLOW | |

FIG. 7

| VECTOR | COLOR | |
|---|---|---|
| (11.52, 10.3) to (12.51, 9.72) | KEY/CYAN | |
| (12.51, 10.52) to (14.4, 9.59) | CYAN/YELLOW | 810 |
| (11.52, 9.8) to (12.51, 10.72) | KEY/YELLOW | |

FIG. 8

```
1 setlinewidth
1 1 0 0 setcmykcolor
11.52 10.3 moveto 12.51 9.72 lineto stroke
1 0 1 0 setcmykcolor
12.51 10.52 moveto 14.4 9.59 lineto stroke
11.52 9.8 moveto 12.51 10.72 lineto stroke
```
910

FIG. 9

APPLYING TRAPS TO A PRINTED PAGE SPECIFIED IN A PAGE DESCRIPTION LANGUAGE FORMAT

CROSS REFERENCE TO A RELATED APPLICATION

This invention is related to U.S. patent application Ser. No. 07/383,400 filed Jul. 21, 1989, now U.S. Pat. No. 5,226,175, entitled "A Technique for Representing Sampled Images", which was also published on Feb. 7, 1991 as a Patent Cooperation Treaty (PCT) application international publication number WO 91/01609 which is hereby incorporated by reference.

FIELD OF THE INVENTION

This invention relates generally to computer-assisted publishing and particularly to a technique for trapping pages specified in a page description language format.

BACKGROUND OF THE INVENTION

For many years, the preferred process for color printing on paper has been to process the page in multiple exposures, or separations. Each separation exposes selected areas of the paper to an ink of a different color--the usual process ink colors are cyan, magenta, yellow and key (CMYK). Additional color inks are often used as spot colors in additional separation.

High-quality printing, such as that required by the publishing industry, poses many difficult problems in controlling the separations. For example, there is often a problem with positional registration of the various separations. As a result, the several inks are never perfectly aligned with one another, and a small gap between regions of different colors occurs, which is often quite visible to the eye as a white line.

One common solution to the registration problem is to perform a technique known as trapping. As the separations are built, regions of a particular color are expanded or "spread" beyond their nominal boundaries, or contracted or "choked" within such boundaries. Various photographic trapping techniques are well known. Although these are sometimes tedious to apply, they are justified in applications such as magazine and newspaper publishing, where the time and labor is available to create individual traps for each printed page.

With the current widespread use of computers in publishing, various systems now perform choking and spreading electronically. The usual approach is to first render the page in pixels at the desired output resolution and to store the rendition in a memory referred to as a "frame buffer". Typically, a frame buffer is assigned to each of the four process separations. If spot colors are used, additional frame buffers are necessary for each of these as well. Each frame buffer is then choked and spread on a pixel-by-pixel basis, and then used to control the printing of its respective color. While this approach requires a frame buffer for each of the output inks, the cost of such hardware is justified in newspaper and magazine publishing.

In recent years, a new class of low-cost applications in the publishing industry have emerged, namely "desktop" publishing. A desktop publishing system user typically uses a standard personal computer to specify his output page as a computer file in a page description language (PDL) such as "Postscript". (Postscript is a trademark of Adobe Systems, Incorporated of Mountain View, Calif.) The Postscript PDL file is then typically sent to a PDL-compatible automatic page setter, which then interprets the file and renders the several color separations.

The typical PDL user usually does not know or care about registration of separations—all they understand is that the color page as originally displayed on the computer screen often does not look the same as the page returned by the printing press. The desktop publishing user can manually examine the page on a computer screen, predict where the registration errors are likely to occur, and then specify additional vectors to cover the errors. However, this is tedious and undesirable to perform manually, and difficult to automate, especially for pages having multiple intersecting colored objects.

Thus, what is needed is a way for a desktop publishing user to automatically produce a properly trapped page from a PDL file. This would provide predictable results from a desktop publishing system without the need to provide special instructions to the page setter to incur the cost of using expensive trapping hardware.

SUMMARY OF THE INVENTION

In brief summary, the invention accepts a Postscript or other page description language (PDL) version of a printed page as an input. The input page data is analyzed to determine the locations of boundaries or edges between regions of different color exist. This color transition information is then fed to a trapping generator which generates trap vectors in PDL form. The resulting trap vector list is then added to the original PDL file, in such a way that the output is in PDL form.

The edge information may be determined in a number of ways. One preferred way is to divide the page into portions, or tiles. All the objects specified by the input are then projected into a clipping window corresponding to the tile. The edge locations can then be determined by examining the vector list, or directly, or by rendering the tile into a single bit map and then analyzing the pixel data to determine the edge locations for all colors at the same time.

There are a number of advantages to this invention. By separating the trapping process from the page rendering process, the desktop publishing user need only manipulate the PDL files with which he is already familiar. This allows the PDL file produced by standard desktop publishing software to directly drive the page setting hardware, without the need to engage the services of an expert typesetter to the page. It also allows trapping rules to be applied automatically at the time the page is created, thereby enabling any desktop publishing user to enjoy the benefits of trapping. The technique operates automatically even on pages consisting of multiple overlapping objects, and with any desired set of trapping rules.

BRIEF DESCRIPTION OF THE DRAWINGS

The above and further advantages of the invention may be better understood by referring to the following description together with the accompanying drawings where in:

FIG. 5 is a Postscript code segment describing the page;

FIG. 7 depicts a list of edge vectors and associated color data for the tile;

FIG. 8 depicts the resulting list of trap vectors for the tile; and

FIG. 9 depicts the trap vectors in Postscript form.

DETAILED DESCRIPTION OF ILLUSTRATIVE EMBODIMENTS

The following is a description of the architecture of a general purpose computer system used to perform traps in page description language (PDL) form according to the invention. It should be understood that the Postscript PDL, the illustrated exemplary page, and trapping rules discussed herein are for illustration only, and are not meant as limitations on the scope of the invention. As will be better understood shortly, the invention lies in the way in which the input file and trapping rules are used to generate a list of trap vectors which are added to the input file.

Figure 1:
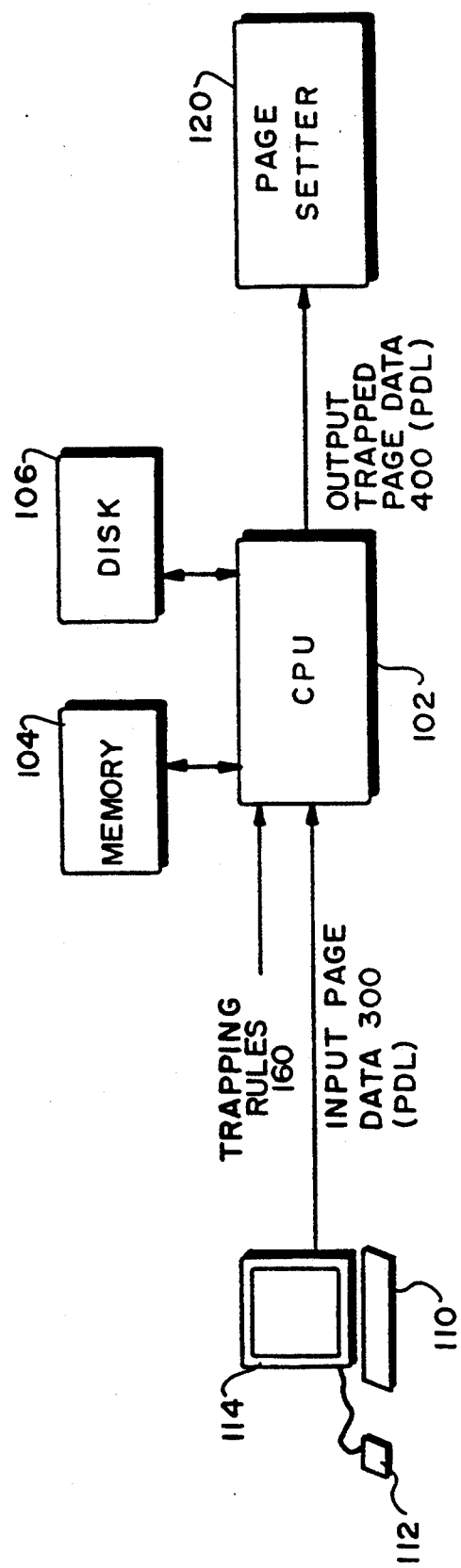
FIG. 1 is a hardware block diagram of a desktop publishing system which traps images according to the invention.

FIG. 1 shows a block diagram of a desktop publishing system 100 including a central processing unit (CPU) 102, a memory 104, and a mass storage device such as a disk drive 106. The system 100 may, for example, be an International Business Machines (IBM) compatible personal computer. Peripheral equipment associated with the desktop publishing system 100 includes standard input devices such as a keyboard 110 and mouse 112, and output devices such as a display 114.

Data describing the format of a desired printed page is typically input to the system 100 by a user who interactively specifies the page layout by using the keyboard 110, mouse 112, display 114 and suitable software. The input page data 300 is typically stored in the memory 104 or disk drive 106 in the form of a page description language (PDL) such as the well-known Postscript format. Other devices and methods not shown may also be used to assemble the input page data 300. The input page data 300 may typically include text, graphics, line art and/or scanned images.

After the input page data 300 entered into the system 100, the CPU 102 then uses a set of trapping rules 160 to produce an output trapped page 400. The trapping rules 160 may be a set of rules specified by the user via the keyboard 110, or may be a preconfigured set of rules stored on the disk drive 106.

The output trapped page 400 is produced in the same PDL format as the input page data 300. The output trapped page 400, being a PDL file, may then be sent to any standard PDL-compatible page-setter 120 or other output device.

Figure 2:
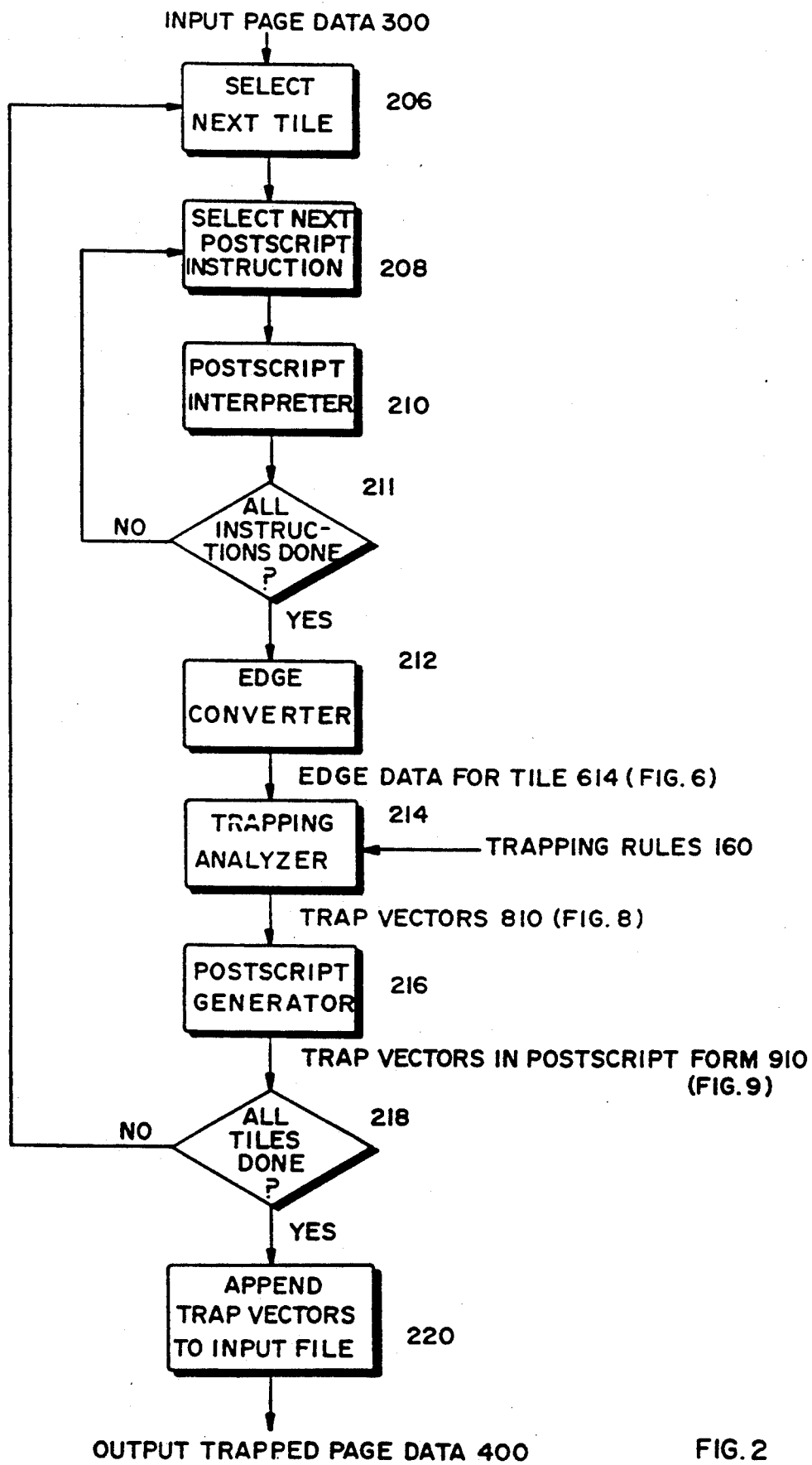
FIG. 2 is a flow chart of the steps performed by the system.

More particularly now, refer to the system software block diagram shown in FIG. 2. In the preferred embodiment, an initial set of instructions, step 206, selects a first sub-portion, or tile, of the output page.

In the next three steps 208, 210, and 211, the CPU 102 then interprets each of the PDL instructions in the input page data 300 to build a representation of the tile which indicates the possible boundaries, or edges, between regions of different color as it will appear on the output page. This is typically done by first selecting the next Postscript instruction in step 208, and then interpreting the instruction by evaluating it within a clipping window which corresponds to the currently selected tile.

Figure 6:
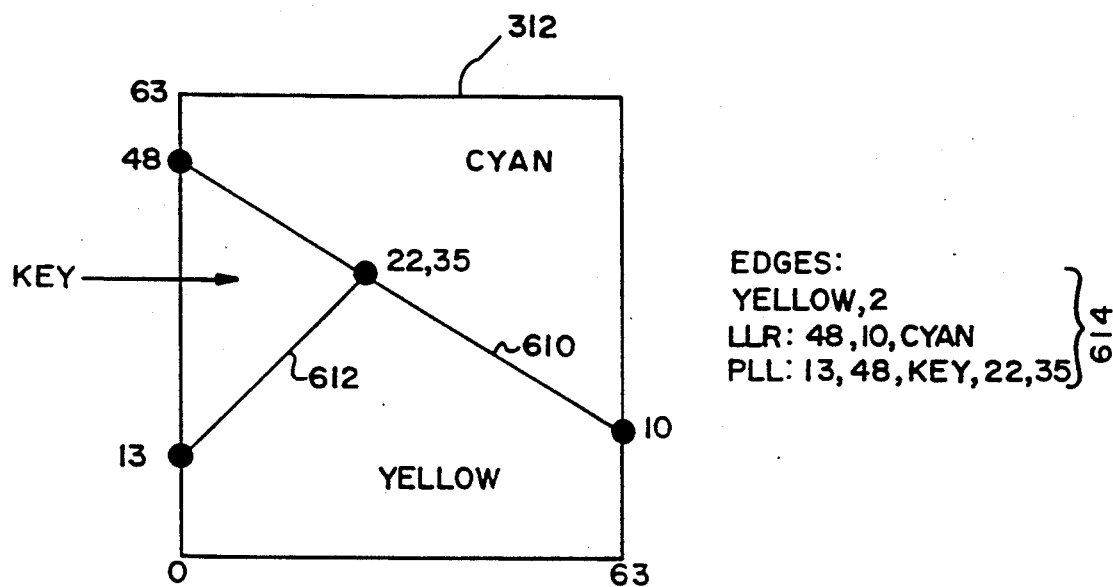
FIG. 6 depicts one tile and the analytic description of the edges within that tile produced by the edge tile converter.

This process continues by looping back through step 211 to convert all of the input PDL instructions. The tile representation is then processed by an edge converter 212, which analyzes the tile representation and outputs information about the edges in the tile in the form of edge data 614 (FIG. 6).

The next set of instructions, referred to as the trapping analyzer 214, uses the edge data 614 and the set of trapping rules 160 to produce a description of the trap vectors 810 in any convenient form.

Step 216 then converts the trap vectors 810 to PDL form, and the process continues by looping back through step 218 until all tiles have been trapped.

The trap vectors for various tiles may be combined or merged to produce a condensed list of trap vectors, if desired, to combine trap vectors from adjacent tiles or from tiles which are overwritten by later PDL instructions. This merging step may typically be part of the generator 216.

A final step 220 appends the trap vectors in PDL form to the input page data 300, to produce the output trapped page data 400.

Figure 3:
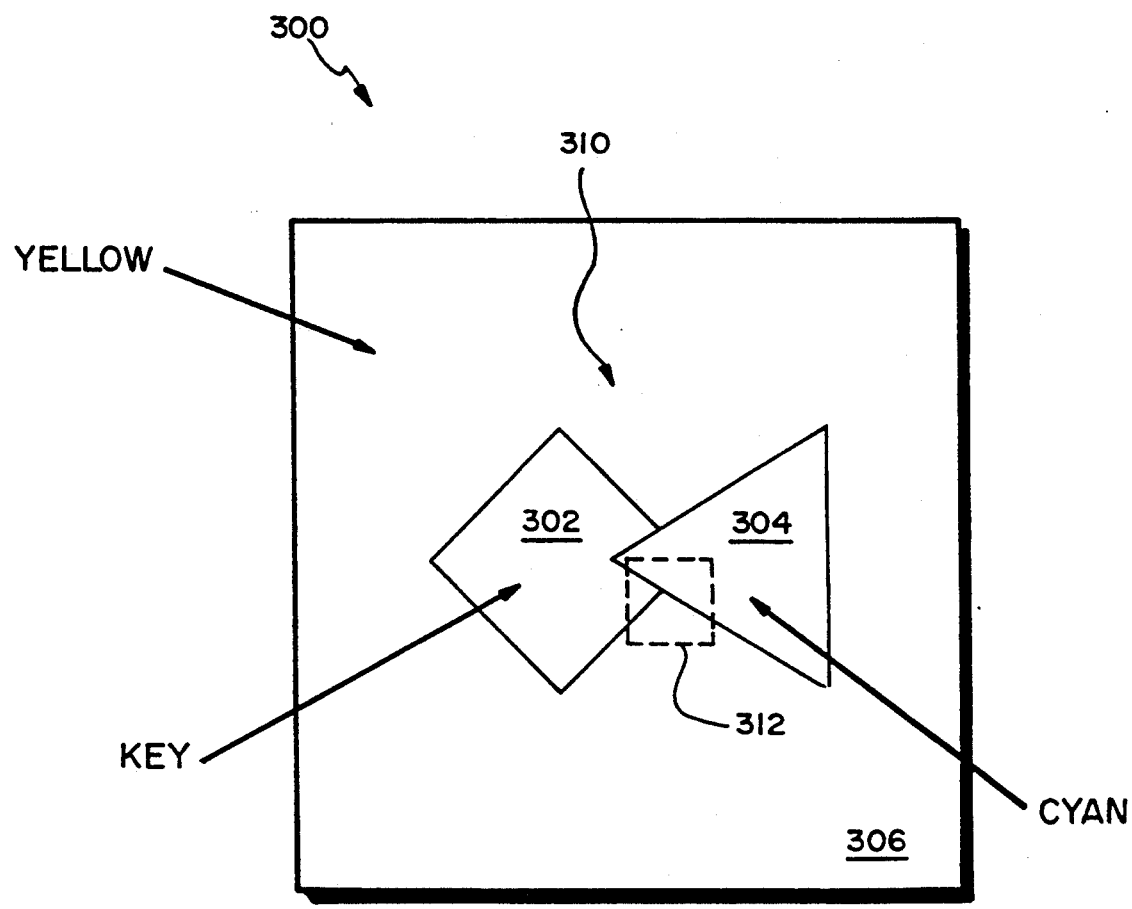
FIG. 3 is an example page, consisting of overlapping objects, which is to be trapped.
Figure 4:
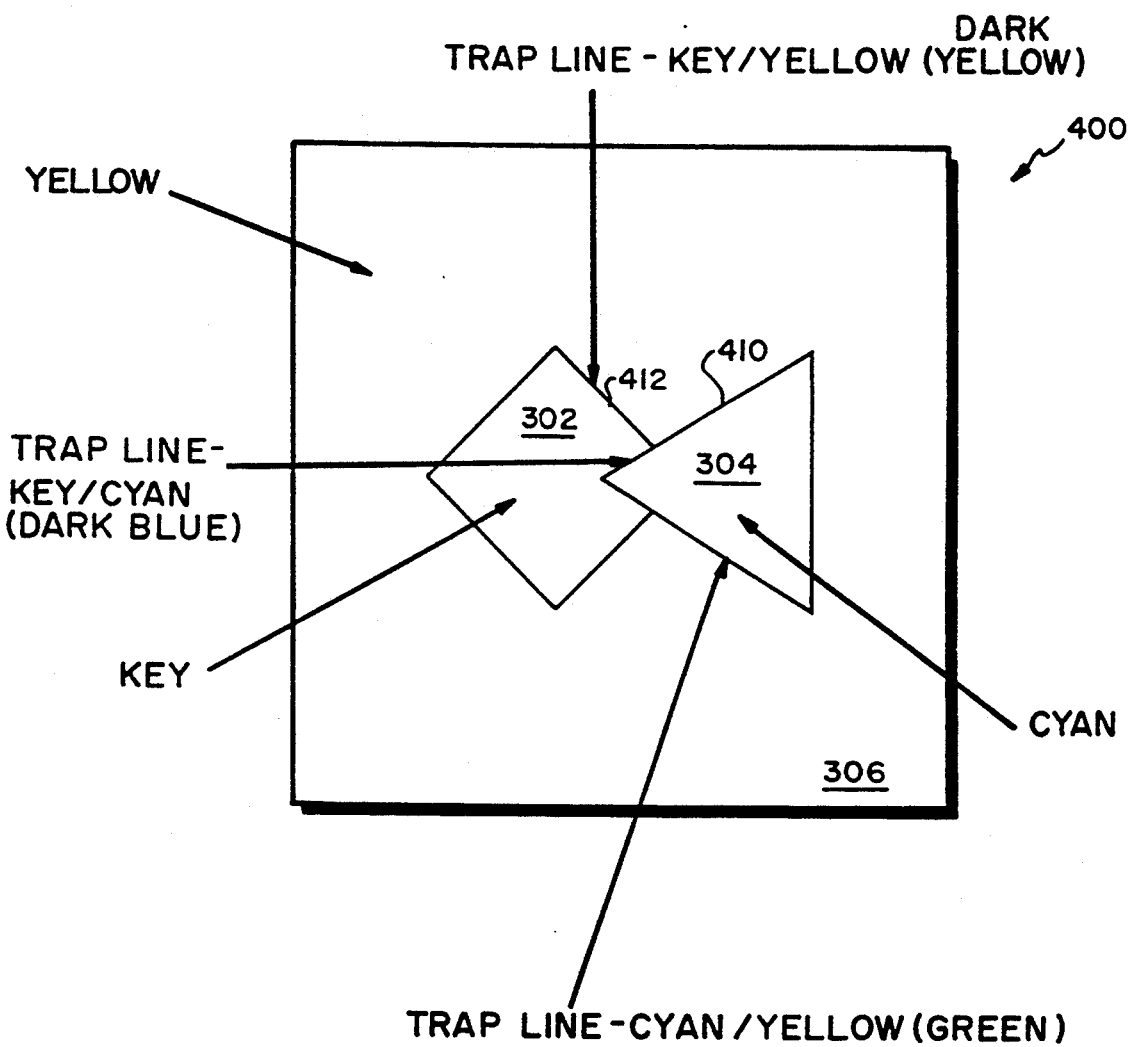
FIG. 4 is the desired trapped output page.

As a further example of how the invention operates, consider an exemplary input page 300 shown in FIG. 3. This input page 300 consists of a key (black) diamond 302 overlapped by a cyan triangle 304 on a yellow background 306. FIG. 4 depicts the desired trapped output page, including the key diamond 302, cyan triangle 304, and yellow background 306, as well as several trap lines, including the four trap lines around the visible edges of the diamond 302, the three trap lines where the triangle meets the background 306, and the two trap lines where the triangle 304 overlaps the diamond 302.

FIG. 5 depicts a Postscript language file corresponding to the input page of FIG. 3. The illustrated Postscript instructions set the background color to key, fill the background, create and fill the magenta diamond shape, and then create and fill the cyan triangle.

Returning to FIGS. 2 and 3, the preferred embodiment of the invention will now be described in greater detail. The input page 300 (FIG. 3) is first "divided" by a grid 310 to determine a set of tiles. Each of the tiles is typically square, and of a convenient size according to the output page coordinate system. The tiles need not be of any particular size.

A particular exemplary tile 312 is thus selected in step 206 (FIG. 2) by simply determining the coordinates of its associated clipping window.

The coordinates of the clipping window for the current tile 312 and the current Postscript instruction are then passed to the Postscript interpreter 210 to determine the edge data 614. In one preferred embodiment, the Postscript interpreter 210 produces a rasterized version of the tile 312 as a bit map wherein each of the pixels comprising the tile is represented, or rendered, as a pixel data value. For example, referring to FIG. 6, if the tile 312 consists of a 64 by 64 array, an array of pixel data values is created, by interpreting the Postscript instruction within the proper clipping window. Each pixel data value typically specifies the cyan, magenta, yellow and key color intensities for its corresponding pixel on the output page. The size of each pixel, or resolution used to render the tile 312, depends upon the desired trap line width.

As per the Postscript language, subsequent instructions selected by repeated passes through steps 208, 210, and 211 simply overwrite the bit map. Once all of the Postscript instructions are processed, the rasterized tile 312 is then analyzed in step 212 to produce edge data 614 in a form such as that shown in FIG. 6. The edge data 614 completely describes the tile 312 as a set of vectors, with the vector coordinates typically specified in the local tile coordinate system.

For example, the output of edge converter 212 for the illustrated edge data 614 in FIG. 6 indicates that the tile 312 has two edges which partially coincide, where the background is yellow. The first edge runs from a tile-left side y-coordinate of 48 to a tile-right side y-coordinate of 10. The color enclosed by this edge is cyan. The second edge runs from the left-side y-coordinate of 13 to a tile top-side coordinate of 48, and has an intersecting point at (22,35), with the enclosed color being key.

The edge converter 212 preferably operates on the bit map by a known method of generating histograms from the pixel data values, and then comparing the pixel data value histograms to templates which represent various arrangements of edges. For further details of the preferred technique used by edge converter 212, please refer to the co-pending United States Patent Application entitled "A Technique for Representing Sampled Images", which was already incorporated by reference.

In an alternate embodiment, the Postscript interpreter 210 may operate without creating a bit map for the tile 312. For example, it may create an array of tiles as a hierarchical data structure. Each Postscript instruction is then processed by projecting the specified object into a number of clipping windows specified by the array of tiles. The specified object representation is stored as a list of vectors associated with each tile. As the input data various vectors are in turn added to each tile. In such an embodiment, edge converter 212 then analyzes the resulting vector list to determine what would be visible in each tile when rendered.

In any event, the trapping analyzer 214 then takes the edge data 614 and produces a list of vectors and associated color information that describe the boundaries in each tile. For example, the trapping analyzer 214 determines that the exemplary tile 312 consists of three vectors as follows:

| VECTOR COORDINATES | LEFT COLOR | RIGHT COLOR |
|---|---|---|
| (0,48) TO (22,35) | CYAN | KEY |
| (22,35) TO (63,10) | CYAN | YELLOW |
| (0,13) TO (22,35) | KEY | YELLOW |

It may be necessary, wherever a vector coincides with the tile grid 310, to examine adjacent tiles to determine the color information.

The trapping analyzer 214 then typically translates the vectors from the tile coordinate system (that is, 64 by 64) to the coordinate system used by the output page; in default Postscript units (points), the vectors are translated to the three vectors 710 shown in FIG. 7. Each of the vectors thus consists of a starting point, an ending point, a left-hand color and a right-hand color.

The trapping analyzer 214 then takes this vector description 710 of the edges in the tile 312 and performs the desired trapping. In the embodiment being described, a simple set of trapping rules is used. The first rule is to assign a relative darkness value to each color, with key being the darkest color, cyan being a middle darkness color, and yellow being the lightest color. A second rule specifies that at each color transition, the lighter color is to be "spread under" the darker color. Each trap vector is thus created by offsetting the associated edge by one-half the desired trap width toward the side of the darker color; the trap vector is drawn in a color which is a function of the two colors abutting side of the edge.

Trap vectors are stroked with a line width equal to the desired trap width. As previously mentioned, the desired trap width typically depends upon the resolution of the page setter 120.

Thus, for a one-point trap width, the trapping analyzer 214 outputs the three trap vectors 810 shown in FIG. 8.

It should be understood that the invention is not intended to be limited to any particular set of trapping rules 160, and that a different set of trapping rules 160 would select different colors or position the trap vector data 810 somewhat differently.

As per step 216, the Postscript generator takes the resulting trap vectors 810 and converts them to a set Postscript form vectors 910, as shown in FIG. 9.

Finally, per step 220, in the case of a Postscript input page 300, the trap vectors 910 may be simply appended to the end of the input page data 300, since they overwrite data positioned earlier in the page description. However, an implementation of the invention for other page description languages in which subsequent objects do not simply overwrite previous objects requires that the merging of the original data structure and the trap vectors occur somewhat differently.

What is claimed is:

1. A process for electronically trapping a printed color page including a plurality of color regions, the color page being expressed in a page description language format, comprising the steps of:
   (a) reading an input data file which represents the color page expressed in the page description language format;
   (b) translating the page description language instructions comprising the input data file into a format suitable for detection and analysis of color edges between color regions;
   (c) analyzing the translated input data file to identify color edges between the color regions, and creating, according to a set of trapping rules, a set of traps for one or more of the identified color edges; and
   (d) producing a trapped output file including the traps, with the traps being expressed in the page description language format.

2. The process of claim 1 wherein the trapped output file further includes page description language description of the color page.

3. The process of claim 1 and further including the step of separating the input data file into a plurality of sub-portions or tiles.

4. The process of claim 3 wherein the steps of translating and analyzing are performed on a tile-by-tile basis.

5. The process of claim 1, wherein the traps are described as trap vectors.

6. The process of claim 5 wherein the step of producing the trapped output file includes the step of merging the trap vectors with the color page.

7. The process of claim 6 wherein the step of merging the trap vectors with the color page includes the steps of:

(a) converting the set of trap vectors into the page description language format; and
(b) adding the trap vectors expressed in the page description language format to the color page to create the trapped output file.

8. The process of claim 5 wherein the step of analyzing the translated input data file produces a plurality of edge descriptions including a list of the locations of color region boundary lines and colors adjacent each boundary line.

9. The process of claim 5 wherein the step of translating the page description language instructions includes the step of generating a bit map representation of the input data file.

10. A process for electronically trapping a color page including a plurality of color regions, the color page being expressed in a page description language in an input data file, the process comprising the steps of:
(a) separating the input data file into a plurality of tiles;
(b) for each tile in the input data file;
  (i) translating the page description language instructions into a format suitable for detection of color edges between color regions;
  (ii) analyzing the tile to identify color edges between color regions;
  (iii) determining whether to create traps for the identified edges;
  (iv) creating, for those edges which are to be trapped as determined in step (iii), a set of trap vectors according to a set of trapping rules;
(c) converting the trap vectors into the page description language; and
(d) appending the converted trap vectors expressed in the page description language to the input data file to create a trapped color page expressed in the page description language.

11. A process for electronically trapping a printed color page including a plurality of objects, the process accepting input page data which represents the page in the form of a page description language and producing output data comprising the input page data transformed by a set of trapping rules, the output data also in the page description language, the process comprising the steps of:
(a) dividing the page into a plurality of sub-portions or tiles, with each tile represented by a clipping window corresponding to the location and size of the tile;
(b) evaluating, for each tile, the input page data within the clipping window and interpreting the input page data of the tile to produce a bit map representation of the tile;
(c) converting the bit map representation of each tile into an edge description, the edge description including a list of the locations of object boundary lines and colors adjacent each boundary line within the tile;
(d) generating a set of trap vectors from the list of edge descriptions, the trap vectors generated in a format compatible with the page description language in which the input page was initially specified; and
(e) merging the set of trap vectors and the input page data to produce the output page data.

12. The process of claim 11 and further including the step of:
repeating, for each of the tiles in the page, the steps of producing a bit map representation, converting the bit map representation, generating a set of trap vectors, and merging the set of trap vectors.

13. Apparatus for electronically trapping a printed color page including a plurality of color regions, the color page being expressed in a page description language format, comprising:
(a) means for reading an input data file which represents the color page expressed in the page description language format;
(b) means for translating the page description language instructions comprising the input data file into a format suitable for detection and analysis of color intersections between color regions;
(c) means for analyzing the translated input data file to identify color intersections between the color regions;
(d) means for creating, for at least some of the color intersections, a set of trap objects according to a set of trapping rules; and
(e) means for producing a trapped output file containing the trap objects, the trap objects being expressed in the page description language format.

14. The apparatus claim 13 wherein the means for analyzing produces a plurality of edge descriptions including a list of the locations of color region boundary lines and colors adjacent each boundary line.

15. The apparatus of claim 13 wherein the means for translating includes means for generating a bit map representation of the input data file including an array of data values within the input data file.

16. The apparatus of claim 13, wherein the trap objects are described as trap vectors.

17. The apparatus of claim 16 wherein the means for producing includes means for merging the trap vectors and a page description language description of the color page.

18. The apparatus of claim 17 wherein the means for merging includes:
(a) means for converting the set of trap vectors into the page description language format; and
(b) means for adding the trap vectors expressed in the page description language format to the color page to create the trapped output file.

* * * * *

UNITED STATES PATENT AND TRADEMARK OFFICE
CERTIFICATE OF CORRECTION

PATENT NO. : 5,295,236
DATED     : March 15, 1994          Page 1 of 6
INVENTOR(S): Per H. Bjorge et al It is certified that error appears in the above-indentified patent and that said Letters Patent is hereby corrected as shown below:

```
The title page should be deleted to be replaced with per
attached title page.

Columns 1-8, should be deleted and substitute therefor
the attached columns 1-8.
```

Signed and Sealed this

Fourth Day of April, 1995

*Attest:*

BRUCE LEHMAN

*Attesting Officer*   *Commissioner of Patents and Trademarks*

United States Patent [19]

Bjorge et al.

[11] Patent Number: 5,295,236
[45] Date of Patent: Mar. 15, 1994

[54] APPLYING TRAPS TO A PRINTED PAGE SPECIFIED IN A PAGE DESCRIPTION LANGUAGE FORMAT

[75] Inventors: Per H. Bjorge, Hollis; Alan Blannin; Keith R. Deutsch, both of Amherst, all of N.H.

[73] Assignee: Aldus Corporation, Seattle, Wash.

[21] Appl. No.: 664,064

[22] Filed: Mar. 4, 1991

[51] Int. Cl.$^5$ .................................................. G06F 15/62
[52] U.S. Cl. ........................................... 395/134; 395/131
[58] Field of Search ................ 395/100, 118, 144–148, 395/155, 161, 117, 134, 135, 131, 109; 358/316, 318, 334, 17, 42, 75, 80; 340/703

[56] References Cited

U.S. PATENT DOCUMENTS

| 4,115,816 | 9/1978 | Moe et al. | 358/283 |
| 4,464,677 | 8/1984 | Kuhn et al. | 358/75 |
| 4,583,116 | 4/1986 | Hennig et al. | 358/75 |
| 4,603,431 | 7/1986 | Grover et al. | 382/56 |
| 4,683,492 | 7/1987 | Sugiura et al. | 358/80 |
| 4,815,009 | 3/1989 | Blatin | 395/134 |
| 4,817,187 | 3/1989 | Lien | 382/56 |
| 4,821,336 | 4/1989 | Roye | 382/56 |
| 4,824,761 | 4/1989 | Sturgis et al. | 430/209 |
| 4,852,485 | 8/1989 | Brunner | 101/211 |
| 4,916,484 | 4/1990 | Ohlig | 355/91 |
| 4,931,861 | 6/1990 | Taniguchi | 358/75 |
| 5,029,115 | 7/1991 | Geraci | 364/523 |
| 5,043,711 | 8/1991 | Harrington | 340/728 |
| 5,113,249 | 5/1992 | Yosefi | 358/75 |
| 5,115,402 | 5/1992 | Matsushiro et al. | 395/141 |
| 5,131,058 | 7/1992 | Ting et al. | 382/47 |

FOREIGN PATENT DOCUMENTS

0189238A1 7/1986 European Pat. Off. .

Primary Examiner—Heather Herndon
Attorney, Agent, or Firm—Christensen, O'Connor, Johnson & Kindness

[57] ABSTRACT

A trapping technique which accepts a Postscript or other page description language (PDL) file and outputs a file in PDL format having the correct traps. The input page is first divided into sub-portions, or tiles, and the tiles are individually processed by evaluating the input file in a corresponding clipping window. Each tile is then analyzed to determine where edges exist. The edge data is fed to an edge converter which produces a list of color transitions consisting of the analytic description of each edge and the color information along the sides of the edge. The color transition information is fed to a trapping analyzer which generates trap vectors in accordance with a set of desired trapping rules. The trap vectors are then converted to PDL form. As a final step, the trap vectors are added to the original PDL file. The final trapped page may be printed on standard typesetters without the need for special trap generator hardware.

24 Claims, 7 Drawing Sheets

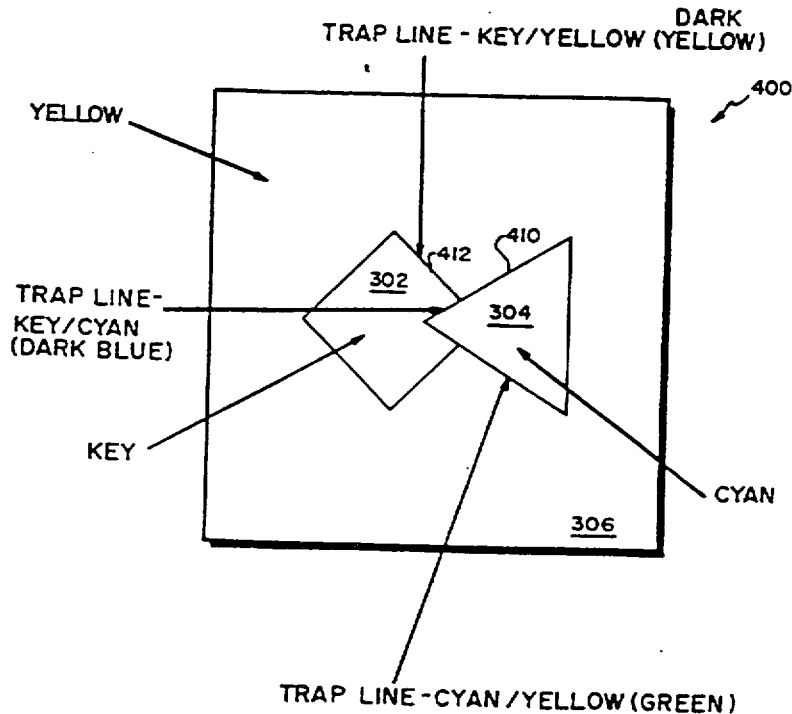

ADDING TRAPS TO A PRINTED PAGE SPECIFIED IN A PAGE DESCRIPTION LANGUAGE FORMAT

CROSS REFERENCE TO A RELATED APPLICATION

This invention is related to U.S. patent application Ser. No. 07/383,400 filed Jul. 21, 1989, now U.S. Pat. No. 5,226,175, entitled "A Technique for Representing Sampled Images", which was also published on Feb. 7, 1991 as a Patent Cooperation Treaty (PCT) application international publication number WO 91/01609 which is hereby incorporated by reference.

FIELD OF THE INVENTION

This invention relates generally to computer-assisted publishing and particularly to a technique for trapping pages specified in a page description language format.

BACKGROUND OF THE INVENTION

For many years, the preferred process for color printing on paper has been to process the page in multiple exposures, or separations. Each separation exposes selected areas of the paper to an ink of a different color--the usual process ink colors are cyan, magenta, yellow and key (CMYK). Additional color inks are often used as spot colors in additional separation.

High-quality printing, such as that required by the publishing industry, poses many difficult problems in controlling the separations. For example, there is often a problem with positional registration of the various separations. As a result, the several inks are never perfectly aligned with one another, and a small gap between regions of different colors occurs, which is often quite visible to the eye as a white line.

One common solution to the registration problem is to perform a technique known as trapping. As the separations are built, regions of a particular color are expanded or "spread" beyond their nominal boundaries, or contracted or "choked" within such boundaries. Various photographic trapping techniques are well known. Although these are sometimes tedious to apply, they are justified in applications such as magazine and newspaper publishing, where the time and labor is available to create individual traps for each printed page.

With the current widespread use of computers in publishing, various systems now perform choking and spreading electronically. The usual approach is to first render the page in pixels at the desired output resolution and to store the rendition in a memory referred to as a "frame buffer". Typically, a frame buffer is assigned to each of the four process separations. If spot colors are used, additional frame buffers are necessary for each of these as well. Each frame buffer is then choked and spread on a pixel-by-pixel basis, and then used to control the printing of its respective color. While this approach requires a frame buffer for each of the output inks, the cost of such hardware is justified in newspaper and magazine publishing.

In recent years, a new class of low-cost applications in the publishing industry have emerged, namely "desktop" publishing. A desktop publishing system user typically uses a standard personal computer to specify his output page as a computer file in a page description language (PDL) such as "Postscript". (Postscript is a trademark of Adobe Systems, Incorporated of Mountain View, Calif.) The Postscript PDL file is then typically sent to a PDL-compatible automatic page setter, which then interprets the file and renders the several color separations.

The typical PDL user usually does not know or care about registration of separations—all they understand is that the color page as originally displayed on the computer screen often does not look the same as the page returned by the printing press. The desktop publishing user can manually examine the page on a computer screen, predict where the registration errors are likely to occur, and then specify additional vectors to cover the errors. However, this is tedious and undesirable to perform manually, and difficult to automate, especially for pages having multiple intersecting colored objects.

Thus, what is needed is a way for a desktop publishing user to automatically produce a properly trapped page from a PDL file. This would provide predictable results from a desktop publishing system without the need to provide special instructions to the page setter to incur the cost of using expensive trapping hardware.

SUMMARY OF THE INVENTION

In brief summary, the invention accepts a Postscript or other page description language (PDL) version of a printed page as an input. The input page data is analyzed to determine the locations of boundaries or edges between regions of different color exist. This color transition information is then fed to a trapping generator which generates trap vectors in PDL form. The resulting trap vector list is then added to the original PDL file, in such a way that the output is in PDL form.

The edge information may be determined in a number of ways. One preferred way is to divide the page into portions, or tiles. All the objects specified by the input are then projected into a clipping window corresponding to the tile. The edge locations can then be determined by examining the vector list, or directly, or by rendering the tile into a single bit map and then analyzing the pixel data to determine the edge locations for all colors at the same time.

There are a number of advantages to this invention. By separating the trapping process from the page rendering process, the desktop publishing user need only manipulate the PDL files with which he is already familiar. This allows the PDL file produced by standard desktop publishing software to directly drive the page setting hardware, without the need to engage the services of an expert typesetter to the page. It also allows trapping rules to be applied automatically at the time the page is created, thereby enabling any desktop publishing user to enjoy the benefits of trapping. The technique operates automatically even on pages consisting of multiple overlapping objects, and with any desired set of trapping rules.

BRIEF DESCRIPTION OF THE DRAWINGS

The above and further advantages of the invention may be better understood by referring to the following description together with the accompanying drawings where in:

FIG. 1 is a hardware block diagram of a desktop publishing system which traps images according to the invention;

FIG. 2 is a flow chart of the steps performed by the system;

FIG. 3 is an example page, consisting of overlapping objects, which is to be trapped;

FIG. 4 is the desired trapped output page;

FIG. 5 is a Postscript code segment describing the page;

FIG. 6 depicts one tile and the analytic description of the edges within that tile produced by the edge tile converter;

FIG. 7 depicts a list of edge vectors and associated color data for the tile;

FIG. 8 depicts the resulting list of trap vectors for the tile; and

FIG. 9 depicts the trap vectors in Postscript form.

DETAILED DESCRIPTION OF ILLUSTRATIVE EMBODIMENTS

The following is a description of the architecture of a general purpose computer system used to perform traps in page description language (PDL) form according to the invention. It should be understood that the Postscript PDL, the illustrated exemplary page, and trapping rules discussed herein are for illustration only, and are not meant as limitations on the scope of the invention. As will be better understood shortly, the invention lies in the way in which the input file and trapping rules are used to generate a list of trap vectors which are added to the input file.

FIG. 1 shows a block diagram of a desktop publishing system 100 including a central processing unit (CPU) 102, a memory 104, and a mass storage device such as a disk drive 106. The system 100 may, for example, be an International Business Machines (IBM) compatible personal computer. Peripheral equipment associated with the desktop publishing system 100 includes standard input devices such as a keyboard 110 and mouse 112, and output devices such as a display 114.

Data describing the format of a desired printed page is typically input to the system 100 by a user who interactively specifies the page layout by using the keyboard 110, mouse 112, display 114 and suitable software. The input page data 300 is typically stored in the memory 104 or disk drive 106 in the form of a page description language (PDL) such as the well-known Postscript format. Other devices and methods not shown may also be used to assemble the input page data 300. The input page data 300 may typically include text, graphics, line art and/or scanned images.

After the input page data 300 entered into the system 100, the CPU 102 then uses a set of trapping rules 160 to produce an output trapped page 400. The trapping rules 160 may be a set of rules specified by the user via the keyboard 110, or may be a preconfigured set of rules stored on the disk drive 106.

The output trapped page 400 is produced in the same PDL format as the input page data 300. The output trapped page 400, being a PDL file, may then be sent to any standard PDL-compatible page-setter 120 or other output device.

More particularly now, refer to the system software block diagram shown in FIG. 2. In the preferred embodiment, an initial set of instructions, step 206, selects a first sub-portion, or tile, of the output page.

In the next three steps 208, 210, and 211, the CPU 102 then interprets each of the PDL instructions in the input page data 300 to build a representation of the tile which indicates the possible boundaries, or edges, between regions of different color as it will appear on the output page. This is typically done by first selecting the next Postscript instruction in step 208, and then interpreting the instruction by evaluating it within a clipping window which corresponds to the currently selected tile.

This process continues by looping back through step 211 to convert all of the input PDL instructions. The tile representation is then processed by an edge converter 212, which analyzes the tile representation and outputs information about the edges in the tile in the form of edge data 614 (FIG. 6).

The next set of instructions, referred to as the trapping analyzer 214, uses the edge data 614 and the set of trapping rules 160 to produce a description of the trap vectors 810 in any convenient form.

Step 216 then converts the trap vectors 810 to PDL form, and the process continues by looping back through step 218 until all tiles have been trapped.

The trap vectors for various tiles may be combined or merged to produce a condensed list of trap vectors, if desired, to combine trap vectors from adjacent tiles or from tiles which are overwritten by later PDL instructions. This merging step may typically be part of the generator 216.

A final step 220 appends the trap vectors in PDL form to the input page data 300, to produce the output trapped page data 400.

As a further example of how the invention operates, consider an exemplary input page 300 shown in FIG. 3. This input page 300 consists of a key (black) diamond 302 overlapped by a cyan triangle 304 on a yellow background 306. FIG. 4 depicts the desired trapped output page, including the key diamond 302, cyan triangle 304, and yellow background 306, as well as several trap lines, including the four trap lines around the visible edges of the diamond 302, the three trap lines where the triangle meets the background 306, and the two trap lines where the triangle 304 overlaps the diamond 302.

FIG. 5 depicts a Postscript language file corresponding to the input page of FIG. 3. The illustrated Postscript instructions set the background color to key, fill the background, create and fill the magenta diamond shape, and then create and fill the cyan triangle.

Returning to FIGS. 2 and 3, the preferred embodiment of the invention will now be described in greater detail. The input page 300 (FIG. 3) is first "divided" by a grid 310 to determine a set of tiles. Each of the tiles is typically square, and of a convenient size according to the output page coordinate system. The tiles need not be of any particular size.

A particular exemplary tile 312 is thus selected in step 206 (FIG. 2) by simply determining the coordinates of its associated clipping window.

The coordinates of the clipping window for the current tile 312 and the current Postscript instruction are then passed to the Postscript interpreter 210 to determine the edge data 614. In one preferred embodiment, the Postscript interpreter 210 produces a rasterized version of the tile 312 as a bit map wherein each of the pixels comprising the tile is represented, or rendered, as a pixel data value. For example, referring to FIG. 6, if the tile 312 consists of a 64 by 64 array, an array of pixel data values is created, by interpreting the Postscript instruction within the proper clipping window. Each pixel data value typically specifies the cyan, magenta, yellow and key color intensities for its corresponding pixel on the output page. The size of each pixel, or resolution used to render the tile 312, depends upon the desired trap line width.

As per the Postscript language, subsequent instructions selected by repeated passes through steps 208, 210, and 211 simply overwrite the bit map. Once all of the Postscript instructions are processed, the rasterized tile 312 is then analyzed in step 212 to produce edge data 614 in a form such as that shown in FIG. 6. The edge data 614 completely describes the tile 312 as a set of vectors, with the vector coordinates typically specified in the local tile coordinate system.

For example, the output of edge converter 212 for the illustrated edge data 614 in FIG. 6 indicates that the tile 312 has two edges which partially coincide, where the background is yellow. The first edge runs from a tile-left side y-coordinate of 48 to a tile-right side y-coordinate of 10. The color enclosed by this edge is cyan. The second edge runs from the left-side y-coordinate of 13 to a tile top-side coordinate of 48, and has an intersecting point at (22,35), with the enclosed color being key.

The edge converter 212 preferably operates on the bit map by a known method of generating histograms from the pixel data values, and then comparing the pixel data value histograms to templates which represent various arrangements of edges. For further details of the preferred technique used by edge converter 212, please refer to the co-pending United States Patent Application entitled "A Technique for Representing Sampled Images", which was already incorporated by reference.

In an alternate embodiment, the Postscript interpreter 210 may operate without creating a bit map for the tile 312. For example, it may create an array of tiles as a hierarchical data structure. Each Postscript instruction is then processed by projecting the specified object into a number of clipping windows specified by the array of tiles. The specified object representation is stored as a list of vectors associated with each tile. As the input data various vectors are in turn added to each tile. In such an embodiment, edge converter 212 then analyzes the resulting vector list to determine what would be visible in each tile when rendered.

In any event, the trapping analyzer 214 then takes the edge data 614 and produces a list of vectors and associated color information that describe the boundaries in each tile. For example, the trapping analyzer 214 determines that the exemplary tile 312 consists of three vectors as follows:

| VECTOR COORDINATES | LEFT COLOR | RIGHT COLOR |
|---|---|---|
| (0,48) TO (22,35) | CYAN | KEY |
| (22,35) TO (63,10) | CYAN | YELLOW |
| (0,13) TO (22,35) | KEY | YELLOW |

It may be necessary, wherever a vector coincides with the tile grid 310, to examine adjacent tiles to determine the color information.

The trapping analyzer 214 then typically translates the vectors from the tile coordinate system (that is, 64 by 64) to the coordinate system used by the output page; in default Postscript units (points), the vectors are translated to the three vectors 710 shown in FIG. 7. Each of the vectors thus consists of a starting point, an ending point, a left-hand color and a right-hand color.

The trapping analyzer 214 then takes this vector description 710 of the edges in the tile 312 and performs the desired trapping. In the embodiment being described, a simple set of trapping rules is used. The first rule is to assign a relative darkness value to each color, with key being the darkest color, cyan being a middle darkness color, and yellow being the lightest color. A second rule specifies that at each color transition, the lighter color is to be "spread under" the darker color. Each trap vector is thus created by offsetting the associated edge by one-half the desired trap width toward the side of the darker color; the trap vector is drawn in a color which is a function of the two colors abutting side of the edge.

Trap vectors are stroked with a line width equal to the desired trap width. As previously mentioned, the desired trap width typically depends upon the resolution of the page setter 120.

Thus, for a one-point trap width, the trapping analyzer 214 outputs the three trap vectors 810 shown in FIG. 8.

It should be understood that the invention is not intended to be limited to any particular set of trapping rules 160, and that a different set of trapping rules 160 would select different colors or position the trap vector data 810 somewhat differently.

As per step 216, the Postscript generator takes the resulting trap vectors 810 and converts them to a set Postscript form vectors 910, as shown in FIG. 9.

Finally, per step 220, in the case of a Postscript input page 300, the trap vectors 910 may be simply appended to the end of the input page data 300, since they overwrite data positioned earlier in the page description. However, an implementation of the invention for other page description languages in which subsequent objects do not simply overwrite previous objects requires that the merging of the original data structure and the trap vectors occur somewhat differently.

What is claimed is:

1. A process for electronically trapping a printed color page including a plurality of color regions, the color page being expressed in a page description language format, comprising the steps of:
   (a) reading an input data file which represents the color page expressed in the page description language format;
   (b) translating the page description language instructions comprising the input data file into a format suitable for detection and analysis of color edges between color regions;
   (c) analyzing the translated input data file to identify color edges between the color regions, and creating, according to a set of trapping rules, a set of traps for one or more of the identified color edges; and
   (d) producing a trapped output file including the traps, with the traps being expressed in the page description language format.

2. The process of claim 1 wherein the trapped output file further includes a page description language description of the color page.

3. The process of claim 1, wherein the traps are described as trap vectors.

4. The process of claim 3 wherein the step of producing the trapped output file includes the step of merging the trap vectors with the color page.

5. The process of claim 4 wherein the step of merging the trap vectors with the color page includes the steps of:
   (a) converting the set of trap vectors into the page description language format; and
   (b) adding the trap vectors expressed in the page description language format to the color page to create the trapped output file.

6. The process of claim 3 wherein the step of analyzing the translated input data file produces a plurality of edge descriptions including a list of the locations of color region boundary lines and colors adjacent each boundary line.

7. The process of claim 3 wherein the step of translating the page description language instructions includes the step of generating a bit map representation of the input data file.

8. The process of claim 1 and further including the step of separating the input data file into a plurality of sub-portions or tiles.

9. The process of claim 8 wherein the steps of translating and analyzing are performed on a tile-by-tile basis.

10. The process of claim 1, wherein the format suitable for detection and analysis of color edges between color regions is a list of vectors.

11. The process of claim 10 and further including the step of analyzing the list of vectors to determine those vectors that are visible.

12. A process for electronically trapping a color page including a plurality of color regions, the color page being expressed in a page description language in an input data file, the process comprising the steps of:
 (a) separating the input data file into a plurality of tiles;
 (b) for each tile in the input data file:
  (i) translating the page description language instructions into a format suitable for detection of color edges between color regions;
  (ii) analyzing the tile to identify color edges between color regions;
  (iii) determining whether to create traps for the identified edges;
  (iv) creating, for those edges which are to be trapped as determined in step (iii), a set of trap vectors according to a set of trapping rules;
 (c) converting the trap vectors into the page description language; and
 (d) appending the converted trap vectors expressed in the page description language to the input data file to create a trapped color page expressed in the page description language.

13. The process of claim 12, wherein the format suitable for detection of color edges between color regions is in a vector list format.

14. The process of claim 13, wherein any visible vectors in the vector list are identified by clipping the tile against the vector list.

15. A process for electronically trapping a printed color page including a plurality of objects, the process accepting input page data which represents the page in the form of a page description language and producing output data comprising the input page data transformed by a set of trapping rules, the output data also in the page description language, the process comprising the steps of:
 (a) dividing the page into a plurality of sub-portions or tiles, with each tile represented by a clipping window corresponding to the location and size of the tile;
 (b) evaluating, for each tile, the input page data within the clipping window and interpreting the input page data of the tile to produce a bit map representation of the tile;
 (c) converting the bit map representation of each tile into an edge description, the edge description including a list of the locations of object boundary lines and colors adjacent each boundary line within the tile;
 (d) generating a set of trap vectors from the list of edge descriptions, the trap vectors generated in a format compatible with the page description language in which the input page was initially specified; and
 (e) merging the set of trap vectors and the input page data to produce the output page data.

16. The process of claim 15 and further including the step of:
 repeating, for each of the tiles in the page, the steps of producing a bit map representation, converting the bit map representation, generating a set of trap vectors, and merging the set of trap vectors.

17. Apparatus for electronically trapping a printed color page including a plurality of color regions, the color page being expressed in a page description language format, comprising:
 (a) means for reading an input data file which represents the color page expressed in the page description language format;
 (b) means for translating the page description language instructions comprising the input data file into a format suitable for detection and analysis of color intersections between color regions;
 (c) means for analyzing the translated input data file to identify color intersections between the color regions;
 (d) means for creating, for at least some of the color intersections, a set of trap objects according to a set of trapping rules; and
 (e) means for producing a trapped output file containing the trap objects, the trap objects being expressed in the page description language format.

18. The apparatus of claim 17 wherein the means for producing includes means for merging the trap vectors and a page description language description of the color page.

19. The apparatus of claim 18 wherein the means for merging includes:
 (a) means for converting the set of trap vectors into the page description language format; and
 (b) means for adding the trap vectors expressed in the page description language format to the color page to create the trapped output file.

20. The apparatus of claim 17 wherein the means for analyzing produces a plurality of edge descriptions including a list of the locations of color region boundary lines and colors adjacent each boundary line.

21. The apparatus of claim 17 wherein the means for translating includes means for generating a bit map representation of the input data file including an array of data values within the input data file.

22. The apparatus of claim 17, wherein the format suitable for detection and analysis of color intersections between color regions is in a vector list format.

23. The apparatus of claim 17, wherein the trap objects are described as trap vectors.

24. The apparatus of claim 22, and further including means for analyzing the vector list to determine those vectors in the list that are visible.

* * * * *